United States Patent [19]

Ulveland

[11] Patent Number: 4,701,852
[45] Date of Patent: Oct. 20, 1987

[54] METHOD AND DEVICE FOR SIGNALING THAT GEAR CHANGE IS REQUIRED

[75] Inventor: Stefan Ulveland, Gothenburg, Sweden

[73] Assignee: AB Volvo, Gothenburg, Sweden

[21] Appl. No.: 638,841

[22] PCT Filed: Dec. 2, 1983

[86] PCT No.: PCT/SE83/00425
§ 371 Date: Aug. 2, 1984
§ 102(e) Date: Aug. 2, 1984

[87] PCT Pub. No.: WO84/02311
PCT Pub. Date: Jun. 21, 1984

[30] Foreign Application Priority Data
Dec. 6, 1982 [SE] Sweden ............... 8206956

[51] Int. Cl.$^4$ ............... B60K 20/08; B60K 41/06; G06F 15/20
[52] U.S. Cl. ............... 364/424.1; 340/52 F
[58] Field of Search ............... 364/424.1; 340/52 F; 74/866

[56] References Cited

U.S. PATENT DOCUMENTS

| | | | |
|---|---|---|---|
| 4,294,341 | 10/1981 | Swart | 74/866 X |
| 4,320,381 | 3/1982 | Olivier | 340/52 F |
| 4,439,833 | 3/1984 | Yamaguchi et al. | 364/431.09 |
| 4,564,906 | 1/1986 | Stephan et al. | 364/424.1 |

FOREIGN PATENT DOCUMENTS

| | | | |
|---|---|---|---|
| 7881 | 2/1980 | European Pat. Off. | 364/442 |
| 2926070 | 1/1981 | Fed. Rep. of Germany | 364/424.1 |
| 3128080 | 2/1983 | Fed. Rep. of Germany | 364/424.1 |
| 2084524 | 4/1982 | United Kingdom | 364/424.1 |
| 2091358 | 7/1982 | United Kingdom | 364/424.1 |

*Primary Examiner*—Felix D. Gruber
*Attorney, Agent, or Firm*—Pollock, Vande Sande & Priddy

[57] ABSTRACT

Method and device for signaling to a vehicle operator that a higher gear should be selected. A microprocessor is connected so that it can sense the rotational speed of the engine and the vehicle road speed. The quotient of the road speed and the engine speed is determined and is compared with a series of predetermined quotients, one for each of the gear selector positions, and the engaged gear is thus determined. For each gear there is registered the quotient of its own gear ratio and that of the next higher gear position, the quotient being zero for the highest gear. The engine speed signal is multiplied by this gear ratio value for the gear engaged and is compared with a maximum value, and if the result exceeds the maximum value, a signal is sent to indicate that a gear change should be made. In accordance with a preferred embodiment, the fact is utilized that the generator, if the generator belt slips, will produce an engine speed value which is too low, so that the first mentioned measured quotient will not agree with the predetermined quotient. An error indication is then sent indicating the need for service.

12 Claims, 3 Drawing Figures

METHOD AND DEVICE FOR SIGNALING THAT GEAR CHANGE IS REQUIRED

The present invention relates to a method of arranging signaling to a vehicle driver that an upward gear change is required. The engine speed is measured and compared to a comparative value, and if one value exceeds the other, a signal is sent to the driver.

The invention also relates to a device for signaling to a vehicle driver in a motor vehicle which has an engine and a transmission comprising a manual gear box with a plurality of shift positions and which includes a tachometer and computing means for signaling excessive engine speed.

A method and a device of this type are known by German Offlenlegungsschrift No. 29 26 070 and have come into use in certain Volkswagen Passat models for example. This known device works as follows: a lamp (LED) is lit as soon as the engine speed exceeds a certain value, circa 2000 rpm. The signal means that the driver should shift up to obtain better fuel economy. If the highest gear is already engaged, there will be no signal.

The known equipment is intended to solve the problem of preventing the engine from running at unnecessarily high speed with a view both to the life of the engine and obtaining good fuel economy. A few experienced drivers find no difficulty, due to much practice, in always driving with the highest possible gear engaged for each occasion, but most other drivers find this to be considerably difficult. It is true that many cars are equipped with tachometers, but it is in practice of limited use to many drivers.

A disadvantage of the known solution is that the increments in the gear box between the different gear speed is not uniform but decreases in the higher gears. If one changes gears at a constant rpm in each gear position, the engine speed after the gear change, which is the relevant rpm in this context, will be different depending on which gear is selected.

Example: VW Passat

A shifting principle according to which gears are changed when an engine speed of 2000 rpm is reached gives the following result:

| 15 km/h | 1st 2000 rpm | 2nd 1118 rpm |
| 27 km/h | 2nd 2000 rpm | 3rd 1333 rpm |
| 41 km/h | 3rd 2000 rpm | 4th 1407 rpm |

An engine speed which is too low will make the vehicle sluggish, and it is unadvisable to drive at low rpm, especially if the load is high, since it may even result in damage to the engine in certain cases. The known solution therefore necessitates making a compromise between the goal of providing an early indication of excessively high engine speed and the risk of obtaining too low an engine speed when shifting up between certain gears.

SUMMARY OF THE INVENTION

One purpose of the present invention is to eliminate this disadvantage and have the indication take primarily into account the engine speed which will be obtained if a higher gear is selected rather than the present engine speed.

These and other purposes are achieved according to the method and device having the characteristics of the invention.

In accordance with a preferred aspect of the invention, the combination is also used for measuring both the engine speed and the vehicle speed and comparing the ratio between them with a predicted value for the respective gear position. Theoretically, this ratio should be constant for each gear position. If the engine speed is measured via the generator, however, the actual engine speed will not be measured if the belt between the generator and the engine is slipping. Therefore the ratio between engine speed and vehicle speed, measured in this manner, will differ from that dictated by the gear ratio. It is good to be aware of such a discrepancy, as it makes it possible to detect a malfunction at an early stage. The malfunction can also be in the clutch, and an indication of this discrepancy is thus an early sign that the vehicle should be serviced.

According to a particular aspect of the invention, it is possible to make the device according to the invention self-teaching. This means that the device, in a special operation without the aid of the operator, will set the ratio between engine speed and vehicle speed (or generator speed and vehicle speed) after the device has been mounted in place. The micro-computer obtains the basic data to make the calculations for the subsequent functioning of the device. An advantage of this solution is that the device can be made in a single version and need not be modified for different makes of vehicles. It is even possible to mount it in any vehicle at all without major modifications and without even ascertaining the necessary data such as the gear ratios of the gear box and transmission, tire dimensions etc.

Since a major purpose of the invention is to signal to the driver when gear shifting is called for, it should also take into account those situations where shifting is not called for despite the fact that the engine speed is, under normal conditions, too high. For example, a cold engine should not be made to pull hard at low engine speed. It can therefore be advisable to add a function which eliminates the signal for shifting up when the engine is cold. This can be done either by connecting a thermoswitch to the engine or by receiving a signal from the engine choke control.

According to a special embodiment, it is possible with the aid of an accelerometer and the current speed signal to detect whether the vehicle is travelling uphill or downhill and, in that case, prevent the shift indication or raise or lower the set engine speed, depending on the incline of the hill. It is also possible to take the engine load into account, for example by an instantaneous value of the fuel consumption (kg/h) to change the shift point.

Instead of setting the device so that when shifting to a higher gear, a minimum speed will not be exceeded which is the same for all gears, a certain fixed variation can be set in order to have shifting to second gear end up at a lower engine speed than for third and fourth gears. For example, the device can be set so that shifting from first to second is done so that the engine speed in second gear will be greater than 1400 rpm, from second to third when the engine speed in third gear will be greater than 1450 rpm and from third to fourth when the engine speed in fourth gear will be greater than 1500 rpm.

Since the operating precondition is the fixed relationship between engine speed and vehicle speed for each gear selection, it is advisable to block the signal when the clutch pedal is depressed. It is also advisable to arrange a sensor to sense when there is no pressure on the accelerator, thereby locking the signal, so there will be no signal for shifting during engine braking.

Another conceivable abnormal situation is if the driver has the gear selector in the neutral position and has released the clutch pedal while moving. If the apparatus is allowed to operate, the result will obviously be erroneous, and if slippage sensing is used, extreme slippage will be indicated, which is obviously erroneous. A method of avoiding this is to arrange sensing of the neutral gear selection position. Since this situation is so abnormal, it should not require more attention than arranging a filtering stop in the program, so that such a situation will not result in a signal.

DESCRIPTION OF THE PREFERRED EMBODIMENT

The microprocessor 1 which is a standard microprocessor (e.g. Motorola 6805, see their handbook), has an input 2 coupled to a speedometer or odometer. It is advisable to measure the speed of one wheel of the vehicle which has a direct drive connection with the gear box, e.g. the propeller shaft. It is possible to have the speed signal come from a magnetic sensor which senses a permanent magnet or the like fixed to a shaft, so that a pulse is sent every time the shaft rotates.

A pulse signal from the car generator is coupled to the microprocessor input 3. For an alternating current generator, the current pulse is taken before rectification; for a direct current generator, the changes in voltage during rotation can be used. In both cases after appropriate pulse shaping, which will be obvious to the person skilled in the art, a pulse series will be produced with a pulse rate directly proportional to the rotational speed of the generator and thus of the engine. It is also possible to sense the actual rotational speed of the engine, for example with a device with a magnet on the engine shaft and a stationary magnetic sensor, or by using the ignition. Generator sensing is however preferable due to the additional advantage of being able to detect belt slippage.

The microprocessor now calculates a quotient between the two speeds, which is an operation which is sufficiently wellknown to the person skilled in the art to not require any explanation here. The value obtained is compared with a series of gear values, one for each gear in the vehicle gear box, so that the computer can determine instantaneously which gear is engaged.

Figure 3:
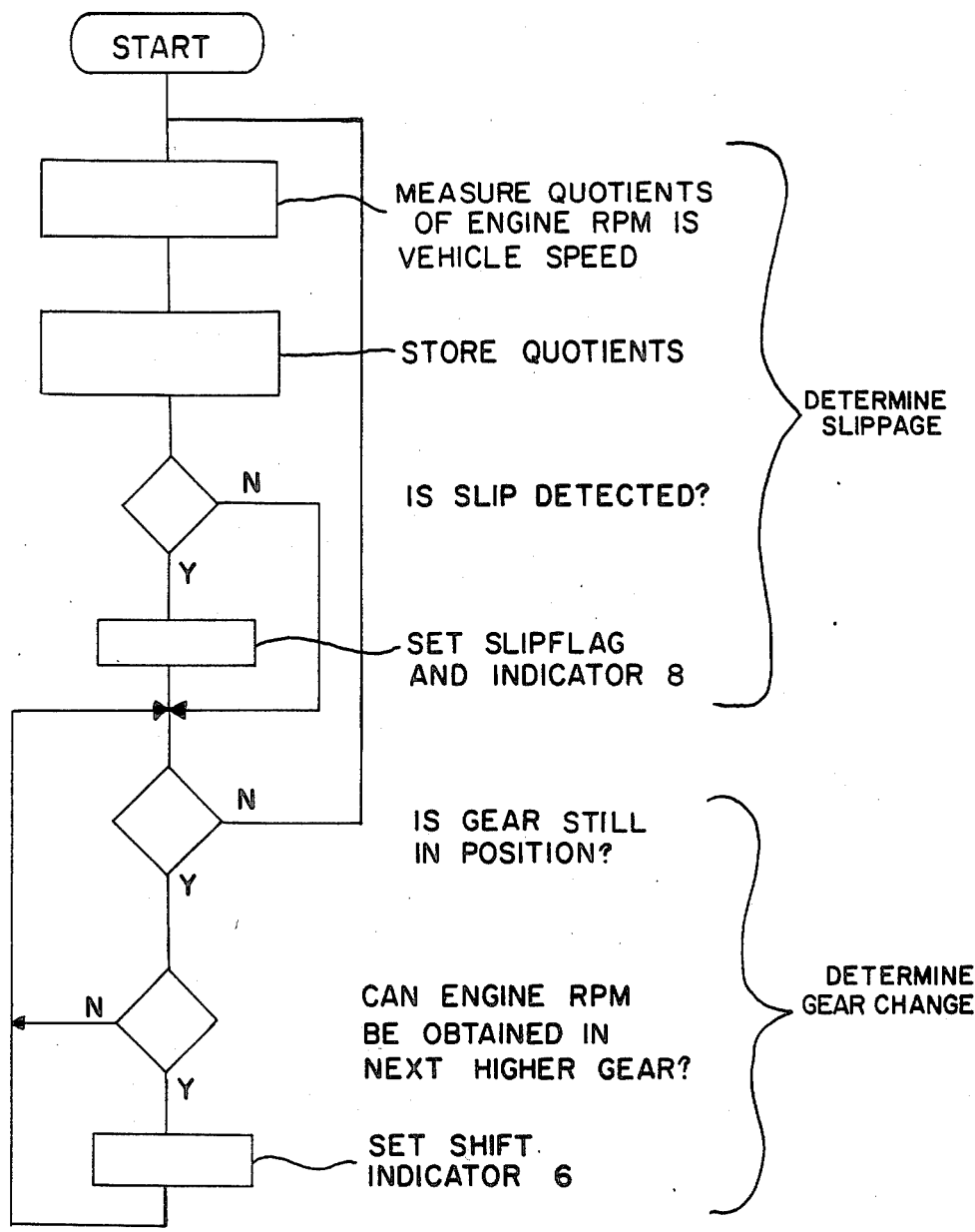
FIG. 3 is a flow chart illustrating the function carried out by the circuit of FIG. 2.

FIG. 3 demonstrates two purposes which are accomplished by the present invention, the first of which, to be explained further, is a detection of any slippage between the engine rotation speed and vehicle speed caused by a malfunctioning clutch or other problem which would result in changes in vehicle speed versus engine rotational speed. The second portion of FIG. 3 demonstrates the determination of the proper time to make a gear change.

Since one purpose of the invention is to see to it that a gear change is recommended as soon as the engine speed after gear change would exceed a certain minimum rpm, there is, for each gear selection position, a maximum rpm stored in the memory, which corresponds to the rpm at which shifting up would achieve this minimum rpm after gear change. The current engine speed is compared to said maximum rpm for the gear engaged, and if the actual engine speed exceeds the maximum rpm, the LED 6 will be turned on.

In the preferred embodiment, the engine speed is multiplied by a value corresponding to the quotient of the gear ratio for the next highest gear divided by the gear ratio for the engaged gear. This provides the engine speed which would have been obtained if the next highest gear was selected. These steps are shown as the last two steps on FIG. 3. FIG. 3 demonstrates, as will be described, another purpose of the invention for determining when there is slip between the engine and the drive train.

If the signal in one of the lines 4,5 is activated however, the LED will not be turned on. These lines indicate a released accelerator and a depressed clutch pedal respectively.

In accordance with an especially advantageous embodiment, the device is self-teaching or adaptive and is carried out by the first step shown in FIG. 3. This means that the quotients for the different gear positions are set in a special setting operation quite simply by engaging the various gears during a setting drive. A manual setting means 7 can place the microprocessor in read mode in which the quotients computed in the same manner as during driving can be set, as shown in FIG. 3, including the first decision block of FIG. 3 and the following flag setting step, gear by gear.

According to another advantageous feature, there is a special signal lamp 8 which will be permanently turned on if the quotient measured during driving differs from the quotient read into the memory. This means that the engine speed and the vehicle speed are not in agreement, generally as a result of slippage, i.e. in the clutch or of the generator belt. When the lamp 8 is lit, the driver should have the situation diagnosed by a mechanic.

Figure 1:
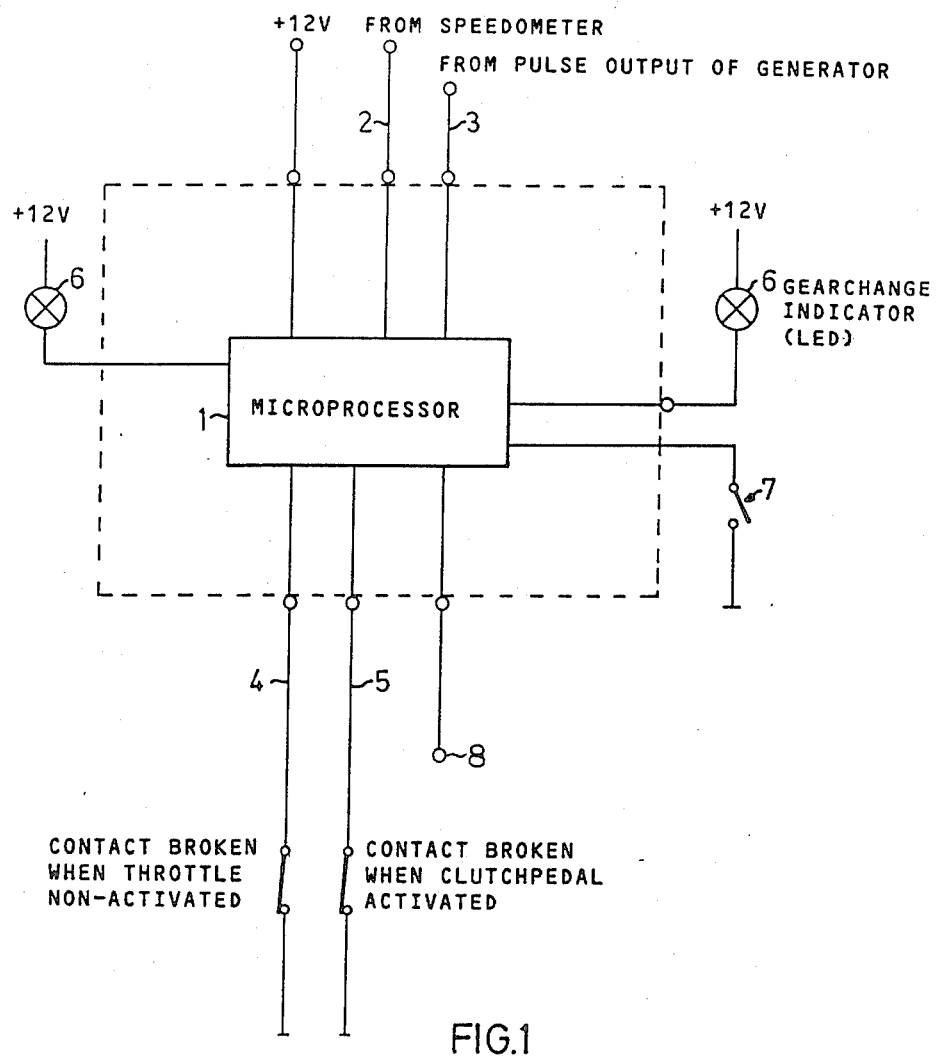
FIG. 1 shows a first embodiment.
Figure 2:
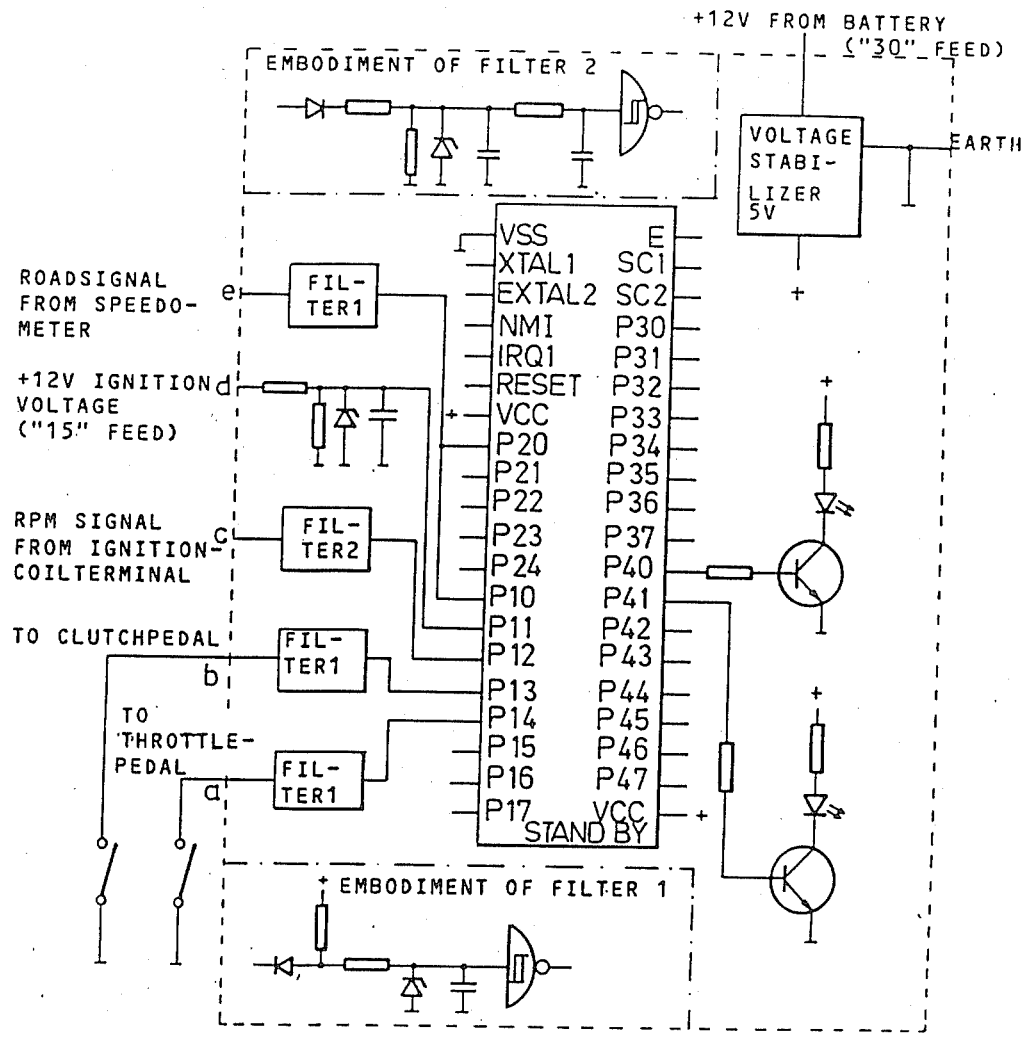
FIG. 2 shows a second embodiment of the invention. An embodiment of the invention will now be described with reference to FIG. 1, which shows a microprocessor arranged according to the principles of the invention.

A more detailed improved embodiment will now be described with reference to FIG. 2. In this case, a Motorola MC 6801 microprocessor is used. For more detailed information concerning this microprocessor, see the "M6801, 8-Bit Single-Chip Microcomputer, Reference Manual". The unit is coupled to a Volvo Model 760 passenger car, which has a 4-cylinder 4-stroke engine. An accelerator switch a, which closes when the accelerator is depressed, and a clutch pedal switch, which also closes when the pedal is depressed, in this case immediately prior to the actual disengagement of the engine and the gear box. An engine speed signal is received from the ignition system, preferably its primary circuit, and produces a pulse for each cylinder ignition. There will thus be two pulses per engine rotation.

One input d is connected to the 12 Volt ignition voltage, from the wire conventionally called "15", and which is activated when the engine is running.

A road distance signal from the speedometer system is fed into input e. In the Volvo 760 there is a tooth wheel with 12 teeth in the rear axle differential, and a sensor, which produces 12 pulses for each rotation of the rear wheels of the vehicle. This pulse train which is used for the speedometer is also used in this example as a road distance signal.

It is obvious that the person skilled in the art, using the present description, will be able to make quite a number of variations of the inventive principle, and it is intended that all such professional applications of the invention will be encompassed by the patent claims.

What is claimed is:

1. A device for signaling a motor vehicle operator to change gear ratios of a gear box connected to an engine of a motor vehicle comprising:
    a tachometer for determining the engine rotational speed;
    a computing unit connected to receive a measured speed of said motor vehicle and said tachometer measured engine rotational speed, and to determine said selected gear ratio, said computing unit storing a plurality of factors for each of said gear ratios representing the ratio of each gear ratio with the next highest gear ratio and multiplying one of said stored factors corresponding to said selected gear ratio with said rotational speed to determine the rotational speed of said engine if the next highest gear ratio is selected; said computing unit generating a gear ratio change signal when said determined rotational speed at said next higher gear ratio exceeds a predetermined minimum, and a signal indicator for receiving said gear ratio change signal for identifying a gear ratio change.

2. The device of claim 1, further comprising:
    means for detecting the motor vehicle speed connected to said computing unit; and
    said computing unit computing a quotient of said motor vehicle speed and said engine rotational speed, and comparing said computed quotient with one stored predetermined quotient from a plurality of stored predetermined quotients for each of said gear ratios, said computing unit signaling said operator when said computed quotient exceeds a respective stored ratio.

3. A device according to claim 2, wherein the engine tachometer receives signals from a generator driven via a belt by the engine, and the computing unit determines a deviation between said computed quotient of said rotational speed and said vehicle speed and the predetermined quotient corresponding to the selected gear ratio, to produce an error signal if a deviation is determined.

4. A device according to claim 1, wherein said computing unit comprises a microcomputer and setting means which can be set to a learning mode for entering, while driving, the stored quotients of the engine speed divided by the vehicle road speed for each selected gear ratio.

5. A device according to claim 1, further comprising a cold engine sensor for inhibiting said gear ratio change signal.

6. A device according to claim 1, comprising a load sensor for changing the engine speed which indicates a gear ratio change at high engine load.

7. A device according to claim 6, wherein the load sensor is an accelerometer.

8. A device according to claim 6, wherein the load sensor is disposed to sense the instantaneous fuel consumption of the engine.

9. A device according to claim 1, further comprising a sensor for sensing the operating position of the clutch, the neutral position of the gear box and a released position of the accelerator pedal, connected to inhibit said gear ratio change signal.

10. A method for signaling a motor vehicle operator to change gear ratios comprising:
    measuring the rotational speed of an engine of said motor vehicle engine by detecting pulses from a generator which is belt driven by said motor vehicle engine;
    determining which of said gear ratios is selected;
    multiplying the measured rotational speed of said engine with a value representing the ratio of said selected gear ratio and the next highest gear ratio, whereby a rotational speed of said engine for said next higher gear ratio is determined;
    comparing said next highest gear ratio rotational speed with a predetermined level; and
    signaling said operator to change gears when said next highest gear ratio rotational speed exceeds said predetermined level.

11. The method of claim 10 wherein said gear ratio is determined by the steps of:
    measuring the road speed of said motor vehicle; and,
    determining the quotient of said rotational speed and said vehicle road speed.

12. The method of claim 11 further comprising:
    comparing said quotient with one of a plurality of stored values which represent a desired quotient for each gear ratio; and
    signaling said operator once said quotient is not said desired quotient, whereby a fault of said vehicle is determined.

* * * * *